US009705745B2

(12) United States Patent
Choi et al.

(10) Patent No.: US 9,705,745 B2
(45) Date of Patent: Jul. 11, 2017

(54) SYSTEM AND METHOD FOR VIRTUALIZING SOFTWARE DEFINED NETWORK (SDN)-BASED NETWORK MONITORING

(71) Applicant: ELECTRONICS AND TELECOMMUNICATIONS RESEARCH INSTITUTE, Daejeon (KR)

(72) Inventors: Tae Sang Choi, Daejeon (KR); Sang Sik Yoon, Daejeon (KR); Sae Hoon Kang, Daejeon (KR); Ji Young Kwak, Gwangju (KR); Young Hwa Kim, Daejeon (KR); Sae Hyong Park, Daejeon (KR); Yong Yoon Shin, Daejeon (KR); Ji Soo Shin, Daejeon (KR); Sun Hee Yang, Daejeon (KR); Byung Yun Lee, Daejeon (KR); Byung Joon Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 110 days.

(21) Appl. No.: 14/702,906

(22) Filed: May 4, 2015

(65) Prior Publication Data
US 2015/0381462 A1 Dec. 31, 2015

(30) Foreign Application Priority Data

Jun. 30, 2014 (KR) .................... 10-2014-0081353

(51) Int. Cl.
*H04L 12/24* (2006.01)
*H04L 12/26* (2006.01)

(52) U.S. Cl.
CPC ...... *H04L 41/0893* (2013.01); *H04L 43/0817* (2013.01); *H04L 43/16* (2013.01)

(58) Field of Classification Search
CPC . H04L 41/0893; H04L 43/0817; H04L 67/22; H04L 43/16
USPC .................................................. 370/241, 252
See application file for complete search history.

(56) References Cited

U.S. PATENT DOCUMENTS

| 8,799,895 | B2 | 8/2014 | Koh et al. |
| 2010/0162259 | A1 | 6/2010 | Koh et al. |
| 2012/0297059 | A1* | 11/2012 | Bross .................. G06F 11/3006 709/224 |

(Continued)

FOREIGN PATENT DOCUMENTS

| DE | WO 2015139732 A1 * | 9/2015 | ......... H04L 43/0817 |
| KR | 10-2013-0083726 A | 7/2013 | |
| KR | 10-1287448 B1 | 7/2013 | |

OTHER PUBLICATIONS

Taesang Choi et al., "SUMA: Software-defined Unified Monitoring Agent for SDN", IEEE, May 5, 2014.

*Primary Examiner* — Obaidul Huq
(74) *Attorney, Agent, or Firm* — LRK Patent Law Firm

(57) ABSTRACT

A system and method for virtualizing SDN-based network monitoring. The system for includes: an information collector, a monitoring component, an information converter, and a resource allocator, in which a user-defined virtual monitor is included so that integrated monitoring may be performed, and expandability may be guaranteed to dynamically respond to a user's, demands.

13 Claims, 6 Drawing Sheets

(56) References Cited

U.S. PATENT DOCUMENTS

| | | | |
|---|---|---|---|
| 2015/0029846 A1* | 1/2015 | Liou | H04L 47/122 370/230.1 |
| 2015/0215195 A1* | 7/2015 | Raps | H04L 45/02 370/254 |

* cited by examiner

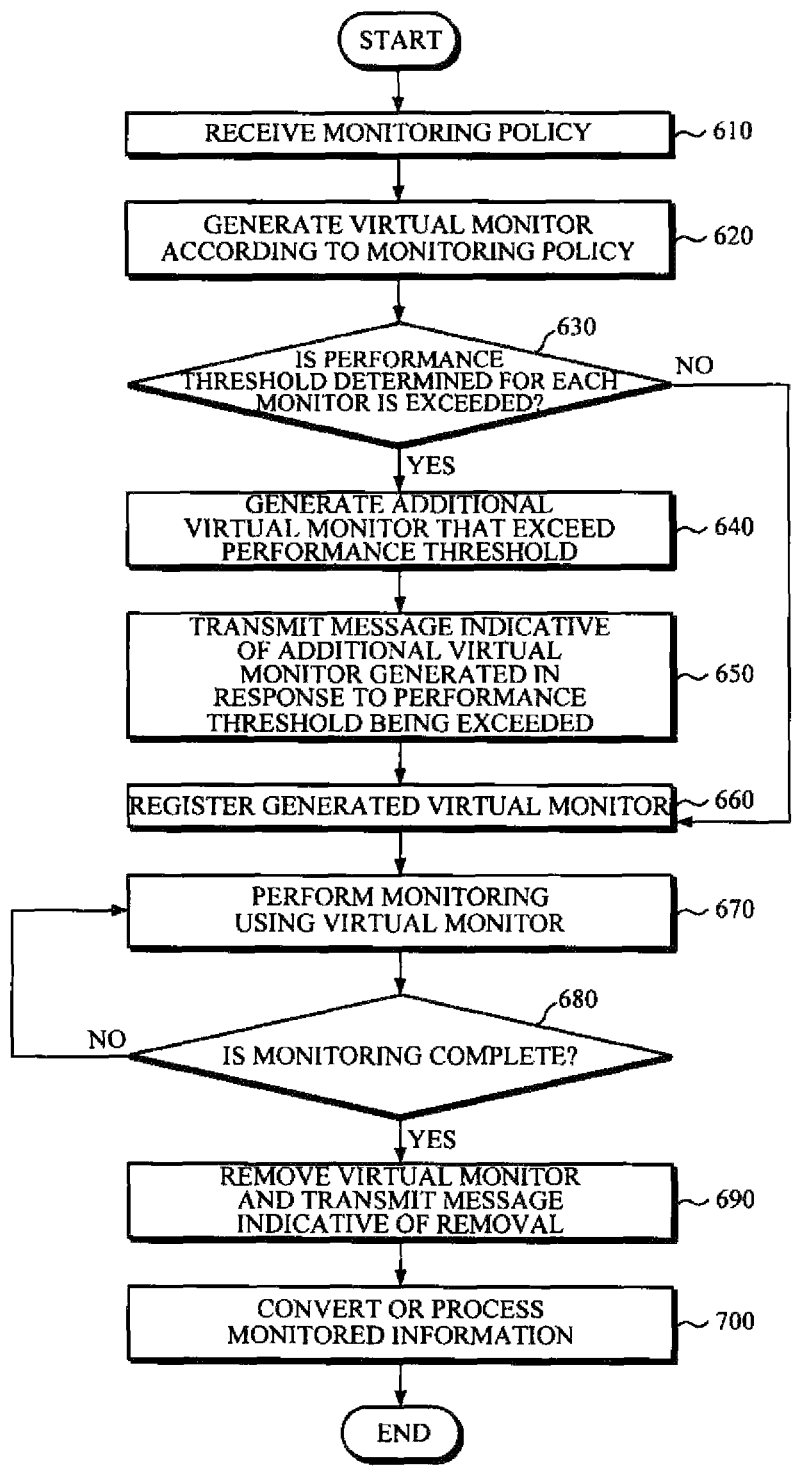

SYSTEM AND METHOD FOR VIRTUALIZING SOFTWARE DEFINED NETWORK (SDN)-BASED NETWORK MONITORING

CROSS-REFERENCE TO RELATED APPLICATION(S)

This application claims priority from Korean Patent Application No. 10-2014-0081353, filed on Jun. 30, 2014, in the Korean Intellectual Property Office, the entire disclosures of which are incorporated herein by references for all purposes.

BACKGROUND

1. Field

The following description generally relates to a system and method for virtualizing Software Defined Network (SDN)-based network monitoring, and more particularly to a system and method for virtualizing a monitoring function that guarantees expandability to dynamically respond to user demands.

2. Description of the Related Art

The general technology for monitoring network resources is designed to monitor network physical resources, among which a physical plane is mainly monitored. Accordingly, when applying the technology to an SDN network where a control plane and a physical plane is separated, the two planes are monitored separately, and a correlation between the planes is not analyzed.

Further, as the general monitoring technology is fixed to equipment exclusively used for monitoring, expandability may not be provided according to user demands.

SUMMARY

Provided is an apparatus and method for monitoring a control plane and a physical plane in consideration of SDN network characteristics, in which a user-defined virtual monitor is included so that integrated monitoring may be performed, and expandability may be guaranteed to dynamically respond to a user's demands.

In one general aspect, there is provided a system for virtualizing SDN-based network monitoring, the system including: a resource allocator configured to allocate physical resources to generate a basic virtual monitor and a user-defined virtual monitor according to a received monitoring policy; an information collector configured to collect information of types predetermined by a user by selecting the information from among information associated with communication equipment connected to a network to be monitored; and a monitoring component configured to generate a virtual monitor by using the allocated physical resources, to perform monitoring the collected information using the generated virtual monitor, and to transmit the monitored information to a network management system.

The system may further include an information converter configured to convert and process the monitored information into information having a format and content required by the network management system.

The monitoring component may further include: a virtual monitor generator configured to generate a virtual monitor that monitors the collected information using the allocated physical resources; a performance evaluator configured to periodically measure performance of the virtual monitor generated by a virtual monitor generator to determine whether a performance threshold determined by a user for each monitor is exceeded, and in response to the performance threshold not being exceeded, configured to continue monitoring, and in response to the performance threshold being exceeded, configured to revise the monitoring policy to additionally generate a monitor that exceeds the performance threshold and to transmit the revised monitoring policy to the resource allocator; and a virtual monitoring component configured to perform monitoring using at least one virtual monitor generated by the virtual monitor generator.

The virtual monitor generator may further include: a basic virtual monitor generator configured to generate a basic virtual monitor by allocating network physical resources according to the monitoring policy; and a user-defined virtual monitor generator configured to generate a user-defined virtual monitor for monitoring that reflects a user's demands by allocating network physical resources according to the monitoring policy.

The virtual monitor generator may further generate a basic virtual monitor and a user-defined virtual monitor by using physical resources that are additionally allocated by the resources allocator according to the revised monitoring policy transmitted from the performance evaluator.

The virtual monitoring component may further include: a basic virtual monitoring component configured to perform monitoring using at least one basic virtual monitor generated by using the allocated physical resources according to the monitoring policy even without being defined by a user; and a user-defined virtual monitoring component configured to perform monitoring using at least one user-defined virtual monitor generated by using physical resources allocated according to the monitoring policy that reflects a user's demands.

The generated virtual monitors may be registered with the information collector, the information converter, or the network management system to enable data transmission and reception.

Upon completion of monitoring using the generated basic virtual monitor and user-defined virtual monitor, the virtual monitoring component may remove the generated basic virtual monitor and user-defined virtual monitor and transmits a message that includes information regarding the removal to the network management system.

In another general aspect, there is provided a method for virtualizing SDN-based network monitoring, the method including: allocating physical resources to generate a basic virtual monitor and a user-defined virtual monitor according to a received monitoring policy; collecting information of types predetermined by a user by selecting the information from among information associated with communication equipment connected to a network to be monitored; and generating a virtual monitor by using the allocated physical resources, monitoring the collected information using the generated virtual monitor, and transmitting the monitored information to a network management system.

The transmitting of the monitored information may further include: using the allocated physical resources to generate the virtual monitor for monitoring the collected information; periodically measuring performance of the generated virtual monitor to determine whether a performance threshold determined by a user for each monitor is exceeded, and in response to the performance threshold not being exceeded, continuing monitoring, and in response to the performance threshold being exceeded, revising the monitoring policy to additionally generate a monitor that exceeds the performance threshold; and monitoring using the at least one generated virtual monitor.

The generating of the virtual monitor may further include: generating a basic virtual monitor by allocating network physical resources according to the monitoring policy; and generating a user-defined virtual monitor for monitoring that reflects a user's demands by allocating network physical resources according to the monitoring policy.

The generating of the virtual monitor may include additionally generating a basic virtual monitor and a user-defined virtual monitor by using physical resources additionally allocated by the resource allocator according to the revised monitoring policy.

The monitoring may include: monitoring using the least one basic virtual monitor generated by using the allocated physical resources according to the monitoring policy even without being defined by a user; and monitoring using the at least one user-defined virtual monitor generated by using the allocated physical resources according to the monitoring policy that reflects a user's demands.

The transmitting of the monitored information may include registering the generated virtual monitor with the information collector, the information converter, or the network management system to enable data transmission and reception.

The monitoring may include removing the generated basic virtual monitor and user-defined virtual monitor upon completion of monitoring using the generated basic virtual monitor and user-defined virtual monitor, and transmitting a message that includes information regarding the removal to the network management system.

BRIEF DESCRIPTION OF THE DRAWINGS

FIG. 6 is a flowchart illustrating a method of virtualizing network monitoring according to a second exemplary embodiment.

Figure 1:
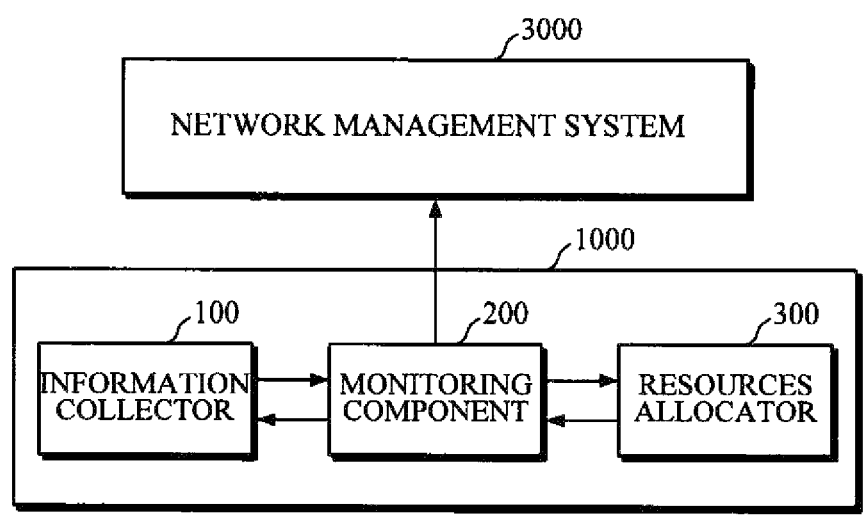
FIG. 1 is a block diagram illustrating an example of a system for virtualizing network monitoring according to a first exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness. Like reference numerals refer to like elements throughout the description of the figures It will be further understood that the terms comprises and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the system and method for virtualizing SDN-based network monitoring will be described with reference to the following drawings.

FIG. 1 is a block diagram illustrating an example of a system for virtualizing network monitoring according to a first exemplary embodiment.

Referring to FIG. 1, the system 1000 for virtualizing network monitoring includes an information collector 100, a monitoring component 200, and a resources allocator 300.

The information collector 100 may collect information of types predetermined by a user among information associated with communication equipment connected to a network to be monitored.

Examples of communication equipment connected to a network to be monitored may include a cloud data center switch, L2 and L3 switches and a router in an enterprise network or a carrier network, an OpenFlow switch in an SDN network, and the like, but the communication equipment is not limited thereto, and any communication equipment that is connected to a network and is required to be monitored may be used.

Further, the types of information predetermined by a user may indicate information selected from among information that may be used as basic sources of analysis required to monitor communication equipment connected to a network.

In the exemplary embodiment, the types of information predetermined by a user may include a Simple Network Management Protocol (SNMP) message, Syslog information, information on status and performance of packets and equipment, an Openflow message, and the like, but is not limited thereto and may include any information, such as information associated with functions, such as smart packet filtering, decreasing event alarms, integrating event alarms, time stamping, and the like, which is related to communication equipment connected to a network and required to be monitored.

The information collector 100 may collect information through a wired/wireless network, but a method of collecting information is not limited thereto, and any method may be used as long as information may be transmitted and received.

The monitor 200 may generate a virtual monitor by using allocated physical resources, may monitor information collected by the information collector 100 using the generated virtual monitor, and may transmit the monitored information to a network management system.

The network management system 3000 is a system that manages a network efficiently and prevents network problems in advance.

In the exemplary embodiment, a monitoring policy may be established by receiving information obtained by monitoring information associated with communication equipment connected to a network, and information that includes user demands regarding a monitoring method and a monitoring level input from a user; and by using the received information.

The monitoring policy may include information indicative of instructions to generate a user-defined virtual monitor that is programmed to perform a monitoring function by receiving information that indicates instructions for generating a virtual basic monitor predetermined to be generated by a user and by receiving and reflecting user demands. However, the monitoring policy is not limited thereto, and may further include information for monitoring.

The established policy is transmitted to the resource allocator 300 to allocate physical resources that may be available in a network to generate a virtual monitor. In this manner, the monitoring component 200 generates a virtual monitor and uses the generated virtual monitor to enable monitoring that may reflect user demands.

In the exemplary embodiment, the network management system 3000 may be included in an SDN controller, but is not limited thereto, and any system that may control transmission and reception of information with a network monitoring virtualization system may also be used.

Monitoring performed by the monitoring component 200 may include a monitoring method using a basic virtual monitor and a monitoring method using a user-defined virtual monitor, and each monitor and monitoring method will be described in further detail with reference to FIG. 3.

Further, in the exemplary embodiment, performance of a generated virtual monitor is evaluated. If performance is above a threshold of virtual monitoring performance included in the monitoring policy, a basic virtual monitor or a user-defined virtual monitor may be additionally generated by allocating network physical resources, and then a message indicative of an additional virtual monitor generated in response to the performance exceeding a performance threshold may be transmitted to the network management system 3000.

In the exemplary embodiment, upon completion of monitoring with virtual monitors, the virtual monitors are removed, and then a message indicative of the removal may be transmitted to the network management system 3000.

The resource allocator 300 may allocate physical resources to generate a basic virtual monitor and a user-defined virtual monitor according to the monitoring policy received from the network management system 3000.

The physical resources refer to operation capabilities that may implement a virtual monitor for monitoring, and allocation of the physical resources may refer to allocation of the operation capabilities according to demands.

Figure 2:
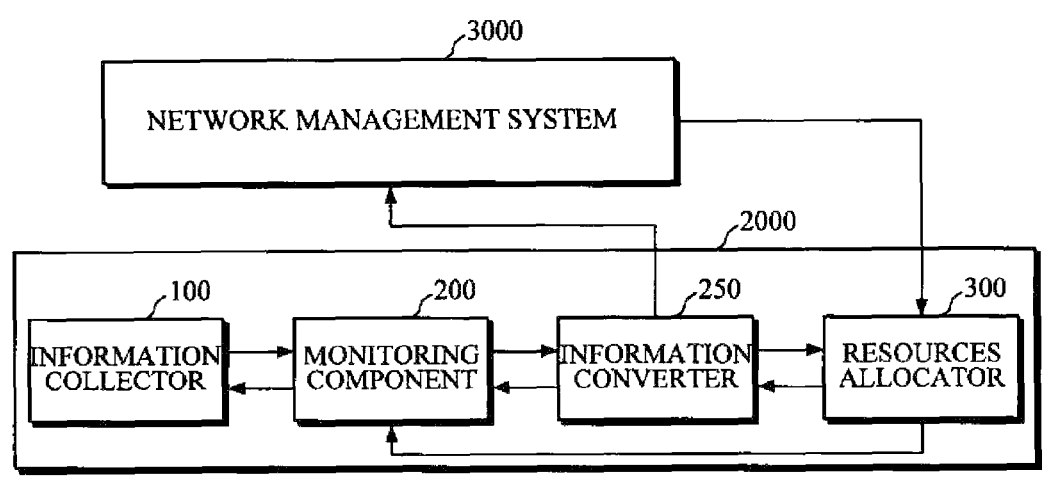
FIG. 2 is a block diagram illustrating an example of a system for virtualizing network monitoring according to a second exemplary embodiment.

FIG. 2 is a block diagram illustrating an example of a system 2000 for virtualizing network monitoring according to a second exemplary embodiment.

Referring to FIG. 2, the system 2000 for virtualizing network monitoring may include an information converter 250 in addition to the system 1000 for virtualizing network monitoring illustrated in FIG. 1.

The information converter 250 may convert and process monitored information to information having a format and content required by the network management system 3000.

A method of converting into a format required by the network management system 3000 may include packet header field analysis and extraction, masking, tunneled or encapsulated packet header analysis, network-level de-duplication/replication/tunneling/encapsulation, and the like, but the method is not limited thereto.

Further, information that include content required by the network management system 3000 may include information obtained by filtering/integrating/selecting/reprioritizing/de-duplicating, which results from packet transformation and adjustment performed as functions of a module.

Figure 3:
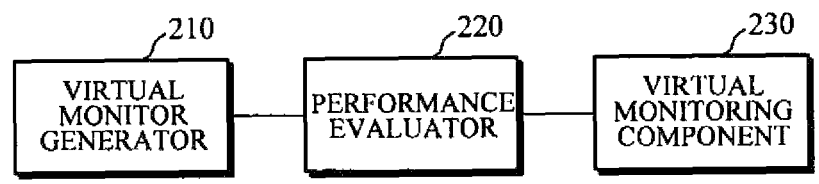
FIG. 3 is a detailed block diagram illustrating an example of a monitoring component illustrated in FIG. 2.

FIG. 3 is a detailed block diagram illustrating an example of a monitoring component illustrated in FIG. 2.

Referring to FIG. 3, the monitoring component 200 includes a virtual monitor generator 210, a performance evaluator 220, and a virtual monitoring component 230.

The virtual monitor generator 210 may use allocated physical resources to generate a virtual monitor that may monitor collected information.

In the exemplary embodiment, the virtual monitor generator 210 may use physical resources allocated by the resource allocator 300 to further generate a basic virtual monitor and a user-defined virtual monitor according to a revised monitoring policy received from the performance evaluator 220.

The virtual monitor generator 210 will be described in further detail with reference to FIG. 4.

The performance evaluator 220 periodically measures performance of a virtual monitor generated by the virtual monitor generator 210 to determine whether a performance threshold determined by a user for each monitor is exceeded. If the performance threshold is not exceeded, monitoring is proceeded, but if exceeded, the monitoring policy is revised to generate an additional monitor that exceeds a performance threshold, and the revised monitoring policy is transmitted to the resource allocator 300.

The monitoring performance measuring period may be predetermined by a user through the network management system 200, and the determined period is included in the monitoring policy and is transmitted to the performance evaluator 220.

Quality of Service (QoS) may be used as criteria of a performance threshold included in the monitoring policy, in which in the case where QoS of monitoring performed by the performance of previously generated virtual monitors is below QoS criteria included in the monitoring policy, it may be determined that the performance threshold is exceeded.

QoS may be used as performance threshold criteria, but is not limited thereto, and any other criteria that may be specific performance criteria may be used.

In order to enable a basic virtual monitor and a user-defined virtual monitor generated by the virtual monitor generator 210 to readily perform monitoring, the generated virtual monitors are registered with the information collector 100 in a first exemplary embodiment, and are registered with the information collector 100 and the information converter 250 in a second exemplary embodiment, so that a channel may be formed to enable information to be exchanged between the generated virtual monitors and the information collector 100, the information converter 250, and the network management system 3000 that are registered with the generated virtual monitors.

Figure 4:
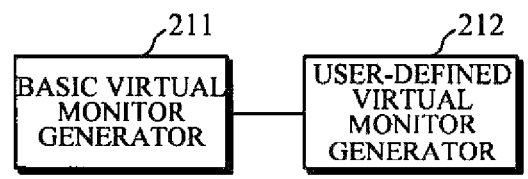
FIG. 4 is a detailed diagram illustrating a virtual monitor generator illustrated in FIG. 2.

FIG. 4 is a detailed diagram illustrating a virtual monitor generator 210 illustrated in FIG. 2.

Referring to FIG. 4, the virtual monitor generator 210 includes a basic virtual monitor generator 211 and a user-defined virtual monitor generator 212.

The basic virtual monitor generator 211 may generate a basic virtual monitor by allocating network physical resources according to the monitoring policy.

Examples of the basic virtual monitor may include a basic cloud monitor, a basic Openflow monitor, and a basic controller monitor, but the monitor is not limited thereto, and monitors having various functions may be added or deleted as a basic virtual monitor by a user's setting determined when designing a system or by changing the setting under the administrator's authority through a network management system.

The basic virtual monitor is determined to be automatically generated according to the monitoring policy without being defined by a user, so that monitors that are basically required for monitoring may be generated without a user's demand to maintain a specific level of monitoring capability, and monitoring may be provided by reflecting various user demands.

The basic cloud monitor refers to a monitor for monitoring information received from a cloud system, and a basic Openflow monitor refers to a monitor for monitoring information received from a transmission plane of an Openflow-based network.

Further, the basic controller monitor refers to a monitor for monitoring information by receiving information on controllers that control a transmission plane of a network.

In the exemplary embodiment, a virtual monitor that may serve as a basic virtual monitor may be generated by allocating network physical resources according to a monitoring policy received from the network management system 3000 or according to a revised monitoring policy received from the performance evaluator 220.

By allocating network physical resources according to a monitoring policy, the user-defined virtual monitor generator 212 may generate a user-defined virtual monitor that may perform monitoring by reflecting user demands.

In the exemplary embodiment, a user-defined virtual monitor that may perform monitoring by reflecting user demands may be generated by allocating network physical resources according to a monitoring policy received from the network management system 3000 or according to a revised monitoring policy received from the performance evaluator 220.

The user-defined virtual monitor is a virtual monitor generated by the virtual monitor generator 210, and may include a controller-defined monitor, a tenant-defined monitor, a cloud-defined monitor, a quality measurement monitor, a traffic engineering monitor, and a security monitor, but the monitor is not limited thereto.

The controller-defined monitor is a virtual monitor that is generated in response to a request of an SDN controller so that user demands may be reflected.

The tenant-defined monitor is a virtual monitor that is generated in response to a request of a virtual tenant network application so that user demands may be reflected.

The cloud-defined monitor is a virtual monitor that is generated in response to a request of a cloud data center manager so that user demands may be reflected.

The quality measurement monitor is a virtual monitor that is generated to monitor communication quality by a method of analyzing communication efficiency and reliability of equipment to be monitored.

The traffic engineering monitor is a virtual monitor that is generated to monitor whether a traffic flow is distributed equally to each link, so as to avoid congestion that occurs due to uneven distribution of traffic flows to links.

The security monitor is a virtual monitor that is generated to monitor internal and external threats to security so that network security may be maintained.

The virtual monitor may be generated by generating a virtual machine (VM) in an SDN-based network as described above, but a method of generating a virtual monitor is not limited thereto.

Both of the basic virtual monitor and the user-defined virtual monitor are used as a virtual monitor, and the virtual monitors may be generated by generating a virtual machine (VM) in an SDN-based network, but is not limited thereto.

Figure 5:
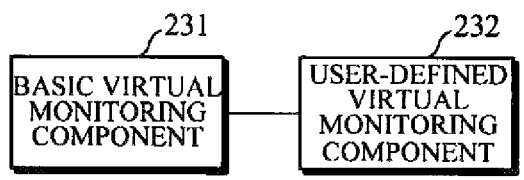
FIG. 5 is a detailed diagram illustrating a virtual monitoring component illustrated in FIG. 4.

FIG. 5 is a detailed diagram illustrating a virtual monitoring component illustrated in FIG. 4.

Referring to FIG. 5, the virtual monitoring component 230 includes a basic virtual monitoring component 231 and a user-defined virtual monitoring component 232.

The basic virtual monitoring component 231 may perform monitoring by using at least one basic virtual monitor that is generated by using physical resources allocated according to the monitoring policy even without being defined by a user.

In the exemplary embodiment, the basic virtual monitoring component 231 may perform monitoring by using at least one basic virtual monitor that is generated by the basic virtual monitor generator 211 according to the monitoring policy that includes information associated with allocation of physical resources.

The user-defined virtual monitoring component 232 may perform monitoring by using at least one user-defined virtual monitor that is generated by using physical resources allocated according to the monitoring policy that reflects user demands.

In the exemplary embodiment, the user-defined virtual monitoring component 232 may perform monitoring by using at least one user-defined virtual monitor that is generated by the user-defined virtual monitoring generator 212 according to the monitoring policy that includes information associated with allocation of physical resources.

In the exemplary embodiment, upon completion of monitoring by using the generated basic virtual monitor and user-defined virtual monitor, the virtual monitoring component 230 removes the generated basic virtual monitor and user-defined virtual monitor, and transmits to the network management system 3000 a message that includes information on the removal.

In the exemplary embodiment, the virtual monitoring component 230 may register the generated virtual monitors with the information collector, the information converter, and the network management system, so that data may be transmitted and received therebetween.

FIG. 6 is a flowchart illustrating a method of virtualizing network monitoring according to a second exemplary embodiment.

Referring to FIG. 6, a monitoring policy is received from a network management system in 610.

The network management system 3000 refers to a system that manages a network efficiently and prevents network problems in advance.

In the exemplary embodiment, the network management system 3000 may establish a monitoring policy by receiving information obtained by monitoring information associated with communication equipment connected to a network, and information that includes user demands regarding a monitoring method and a monitoring level input from a user; and by using the received information.

The monitoring policy may include information indicative of instructions to generate a user-defined virtual monitor that is programmed to perform a monitoring function by receiving information that indicates instructions for generating a virtual basic monitor predetermined to be generated by a user and by receiving and reflecting user demands. However, the monitoring policy is not limited thereto, and may further include information for monitoring.

Further, in the exemplary embodiment, the network management system 3000 may be included in an SDN controller, but the system is not limited thereto, and any system that may control transmission and reception of information with a network monitoring virtualization system 1000 may also be used.

A virtual monitor may be generated according to the received monitoring policy in 620.

A basic virtual monitor and a user-defined virtual monitor may be generated by a method of generating virtual monitors according to the received monitoring policy.

In the exemplary embodiment, the basic virtual monitor and the user-defined virtual monitor are implemented as a virtual monitor, and the virtual monitor may be generated by a method of generating a virtual machine (VM), but the method is not limited thereto.

In the exemplary embodiment, examples of the basic virtual monitor may include a basic cloud monitor, a basic Openflow monitor, and a basic controller monitor, but the monitor is not limited thereto, and monitors having various functions may be added or deleted as a basic virtual monitor by a user's setting determined when designing a system or by changing the setting under the administrator's authority through a network management system.

Further, the received monitoring policy may include a monitoring policy received from the network management system 3000 as well as a revised monitoring policy received from the performance evaluator 320.

In the exemplary embodiment, the user-defined virtual monitor may include a controller-defined monitor, a tenant-defined monitor, a cloud-defined monitor, a quality measurement monitor, a traffic engineering monitor, and a security monitor, but the monitor is not limited thereto.

Upon evaluating performance of generated monitors in 630, if virtual monitoring performance included in the monitoring policy exceeds a performance threshold included in the monitoring policy, the monitoring policy is revised to allocate network physical resources to additionally generate a basic virtual monitor or a user-defined virtual monitor in 640, and then, a message indicative of an additional virtual monitor generated in response to the virtual monitoring performance exceeding a performance threshold is transmitted to the network management system 3000 in 650.

The monitoring performance measuring period may be predetermined by a user through the network management system 300, and the determined period is included in the monitoring policy and is transmitted to the performance evaluator 320.

Further, Quality of Service (QoS) may be used as criteria of a performance threshold included in the monitoring policy, in which in the case where QoS of monitoring performed by the performance of existing virtual monitors is below QoS criteria included in the monitoring policy, it may be determined that the performance threshold is exceeded.

QoS may be used as performance threshold criteria, but is not limited thereto, and any other criteria that may be specific performance criteria may be used.

In order to enable a basic virtual monitor and a user-defined virtual monitor generated by the virtual monitor generator 210 to readily perform monitoring, the generated virtual monitors are registered with the information collector 100 in a first exemplary embodiment, and are registered with the information collector 100 and the information converter 250 in a second exemplary embodiment, so that a channel may be formed to enable information to be exchanged between the generated virtual monitors and the information collector 100, the information converter 250, and the network management system 3000 that are registered with the generated virtual monitors.

The collected information is monitored using the registered monitors in 670.

The collected information may include a Simple Network Management Protocol (SNMP) message, Syslog information, information on status and performance of packets and equipment, an Openflow message, and the like, but is not limited thereto and may include any information such as information according to function demands, such as information associated with functions, such as smart packet filtering, decreasing event alarms, integrating event alarms, time stamping, and the like, which is related to communication equipment connected to a network and required to be monitored.

Information may be collected through a wired/wireless network, but a method of collecting information is not limited thereto, and any method may be used as long as information may be transmitted and received.

Upon determining whether monitoring is complete in 680, and if monitoring has not yet been completed, monitoring is continued, and if monitoring has been completed, the generated virtual monitors are removed, and a message indicative of the removal is transmitted to the network management system in 690.

The monitored information is converted and processed to information having a format and content required by the network management system 3000 in 700.

A method of converting into a format required by the network management system 3000 may include packet header field analysis and extraction, masking, tunneled or encapsulated packet header analysis, network-level de-duplication/replication/tunneling/encapsulation, and the like, but the method is not limited thereto.

Further, information that include content required by the network management system 3000 may include information obtained by filtering/integrating/selecting/reprioritizing/de-duplicating, which results from packet transformation and adjustment performed as functions of a module.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system for virtualizing SDN-based network monitoring, the system comprising:
a resource allocator configured to allocate physical resources to generate a basic virtual monitor and a user-defined virtual monitor according to a received monitoring policy;
an information collector configured to collect information of types predetermined by a user by selecting the information from among information associated with communication equipment connected to a network to be monitored; and
a monitoring component configured to generate a virtual monitor by using the allocated physical resources, to perform monitoring the collected information using the generated virtual monitor, and to transmit the monitored information to a network management system,
wherein the monitoring component comprises a virtual monitor generator comprising a basic virtual monitor generator configured to generate the basic virtual monitor by automatically allocating network physical resources according to the monitoring policy; and a user-defined virtual monitor generator configured to generate the user-defined virtual monitor for monitoring that reflects a user's demands by allocating network physical resources according to the monitoring policy.

2. The system of claim 1, further comprising an information converter configured to convert and process the monitored information into information having a format and content required by the network management system.

3. The system of claim 2, wherein the monitoring component further comprises:
a performance evaluator configured to periodically measure performance of the basic virtual monitor and the user-defined virtual monitor generated by the virtual monitor generator to determine whether a performance threshold determined by a user for each monitor is exceeded, and in response to the performance threshold not being exceeded, configured to continue monitoring, and in response to the performance threshold being exceeded, configured to revise the monitoring policy to additionally generate a monitor that exceeds the performance threshold and to transmit the revised monitoring policy to the resource allocator; and
a virtual monitoring component configured to perform monitoring using the basic virtual monitor and the user-defined virtual monitor generated by the virtual monitor generator.

4. The system of claim 3, wherein the virtual monitor generator further generates the basic virtual monitor and the user-defined virtual monitor by using physical resources that are additionally allocated by the resources allocator according to the revised monitoring policy transmitted from the performance evaluator.

5. The system of claim 3, wherein the virtual monitoring component further comprises;
a basic virtual monitoring component configured to perform monitoring using at least one basic virtual monitor generated by using the allocated physical resources according to the monitoring policy even without being defined by a user; and
a user-defined virtual monitoring component configured to perform monitoring using at least one user-defined virtual monitor generated by using physical resources allocated according to the monitoring policy that reflects a user's demands.

6. The system of claim 3, wherein upon completion of monitoring using the generated basic virtual monitor and user-defined virtual monitor, the virtual monitoring component removes the generated basic virtual monitor and user-defined virtual monitor and transmits a message that includes information regarding the removal to the network management system.

7. The system of claim 2, wherein the generated virtual monitors are registered with the information collector, the information converter, or the network management system to enable data transmission and reception.

8. A method for virtualizing SDN-based network monitoring, the method comprising:
allocating physical resources to generate a basic virtual monitor and a user-defined virtual monitor according to a received monitoring policy;
collecting information of types predetermined by a user by selecting the information from among information associated with communication equipment connected to a network to be monitored; and
generating a virtual monitor by using the allocated physical resources, monitoring the collected information using the generated virtual monitor, and transmitting the monitored information to a network management system,
wherein the generating of the virtual monitor further comprises generating the basic virtual monitor by automatically allocating network physical resources according to the monitoring policy; and generating the user-defined virtual monitor for monitoring that reflects a user's demands by allocating network physical resources according to the monitoring policy.

9. The method of claim 8, wherein the transmitting of the monitored information further comprises:
using the allocated physical resources to generate the virtual monitor for monitoring the collected information;
periodically measuring performance of the generated virtual monitor to determine whether a performance threshold determined by a user for each monitor is exceeded, and in response to the performance threshold not being exceeded, continuing monitoring, and in response to the performance threshold being exceeded, revising the monitoring policy to additionally generate a monitor that exceeds the performance threshold; and
monitoring using the generated virtual monitor.

10. The method of claim 9, wherein the generating of the virtual monitor comprises additionally generating a basic virtual monitor and a user-defined virtual monitor by using physical resources additionally allocated by a resource allocator according to a revised monitoring policy.

11. The method of claim 9, wherein the monitoring comprises:
monitoring using basic virtual monitor generated by using the allocated physical resources according to the monitoring policy even without being defined by a user; and
monitoring using the user-defined virtual monitor generated by using the allocated physical resources according to the monitoring policy that reflects a user's demands.

12. The method of claim 9, wherein the monitoring comprises removing the generated basic virtual monitor and user-defined virtual monitor upon completion of monitoring using the generated basic virtual monitor and user-defined virtual monitor, and transmitting a message that includes information regarding the removal to the network management system.

13. The method of claim 8, wherein the monitoring comprises:
monitoring using the basic virtual monitor generated by using the allocated physical resources according to the monitoring policy even without being defined by a user; and
monitoring using the user-defined virtual monitor generated by using the allocated physical resources according to the monitoring policy that reflects a user's demands.

* * * * *